Oct. 1, 1946.  C. E. BECKMAN ET AL  2,408,363
ELECTRICALLY CONTROLLED STRIP SERVING MACHINE
Filed May 9, 1942  5 Sheets-Sheet 1

INVENTORS
CHARLES E. BECKMAN
EARL B. DODDS
BY
Moses & Nolte
ATTORNEYS

Oct. 1, 1946.   C. E. BECKMAN ET AL   2,408,363
ELECTRICALLY CONTROLLED STRIP SERVING MACHINE
Filed May 9, 1942   5 Sheets-Sheet 3

INVENTORS
CHARLES E. BECKMAN
EARL B. DODDS
BY
Moses & Nolte
ATTORNEYS

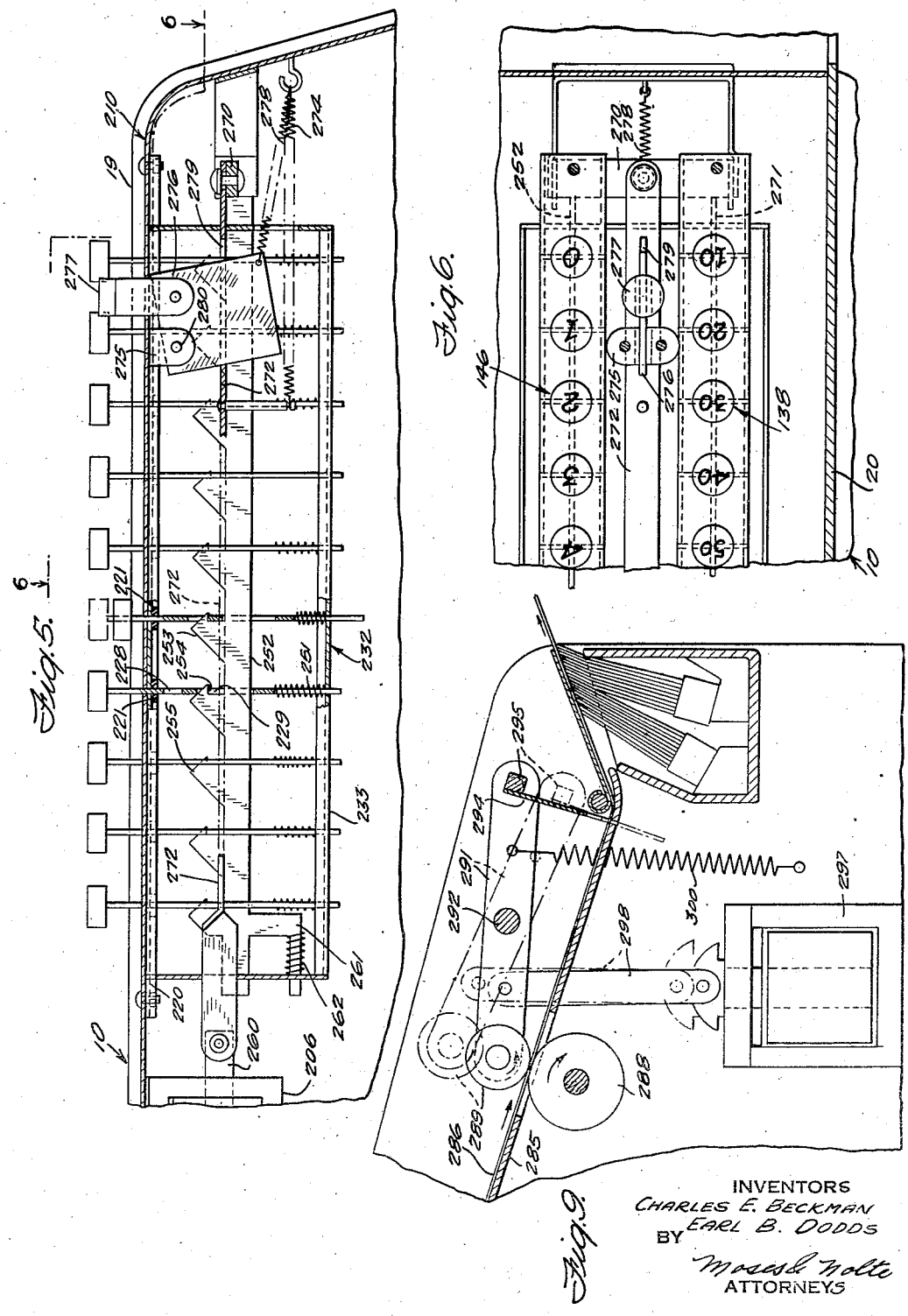

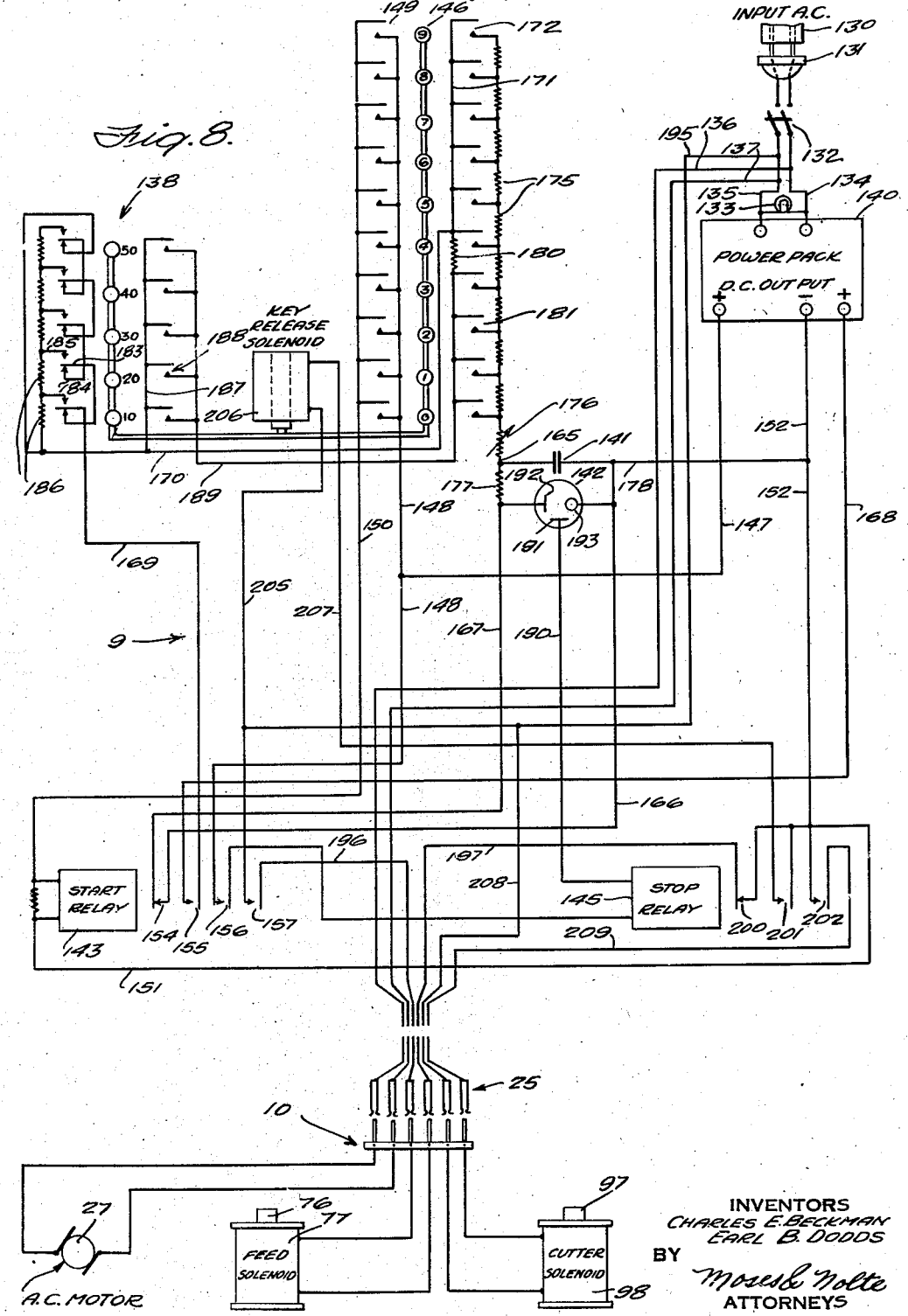

Patented Oct. 1, 1946

2,408,363

UNITED STATES PATENT OFFICE 2,408,363

ELECTRICALLY CONTROLLED STRIP SERVING MACHINE

Charles E. Beckman and Earl B. Dodds, Chicago, Ill., assignors to Better Packages, Inc., Shelton, Conn., a corporation of New York Application May 9, 1942, Serial No. 442,386

32 Claims. (Cl. 164—49)

This invention relates to strip serving devices and more particularly relates to motor driven strip serving devices in which accurate lengths of tape are measured and delivered, the measuring being controlled by electrical means.

The invention contemplates the utilization of an electrical timing circuit for measuring purposes whereby the timing interval coincides with the period of time during which feeding elements deliver tape so that a given interval of time will result in the feed of a given amount of tape. In particular, the use of an electric time measuring circuit is preferred in which the internal condition of the electric circuit when closed progressively changes so as to determine the duration of the tape feeding operation in accordance with the condition of the circuit and not by reason of the physical movements of the tape or of mechanical parts associated with the feed thereof.

Strip serving devices have been proposed which are said to be adapted to serve various lengths of gummed moistened strip as the occasion may demand. Many of such machines depend upon the estimate of the operator of the amount of tape necessary, which estimate even when the operator is experienced, commonly results in a wasting of a substantial amount of tape since a guess of a length too short for use means waste of the entire piece delivered and a length which is longer than necessary may mean that as much as one third or one half more than the amount of tape necessary is delivered with each delivery cycle of the machine.

Machines have also been proposed equipped with visual or other measuring devices, but these machines possess the disadvantage that in the case of visual measuring, the operator cannot operate at maximum speed and still measure properly and in the case of other measuring devices, the mechanisms themselves, for reasons of momentum feed from machine inertia or other causes, are inaccurate and result in waste of tape. Furthermore, such machines if operated by hand or foot power deliver the tape at different speeds depending upon the vigor with which the tape delivery devices are actuated. This results in variable moistening of the tape, too much moisture being applied if the feed is too slow and too little if too fast.

Machines have also been proposed for delivering measured lengths of tape depending upon the mechanical movement of elements driven in accordance with the operation of the tape feeding devices and also by devices intended to be operated by contact with the tape itself. These machines, however, present mechanical complications and when dependent upon an actuation by the tape, are subject to difficulties due to the unstable quality of the tape, its likelihood of buckling, curling and sticking, and other objections.

The present invention contemplates the obviation of all of these difficulties by application, to a simple construction of tape delivering machine including power driving means, of the principles of an electrical timing circuit whose internal condition can be varied irrespective of the amount of tape fed to effect a control by predetermined intervals of time, said principles being modified, improved and adapted to the specific problem of delivery of accurate lengths of gummed uniformly moistened tape ready for use in a shipping room.

More specifically the invention contemplates the utilization of a pair of relatively movable feeding elements which can be alternately caused to grasp and release the tape in and from tape feeding relation and further contemplates the utilization of an automatically operated shear means which will sever the tape after each tape feeding enggagement of the tape feeding elements.

In the preferred construction of our invention it is contemplated that the feeding elements or at least one of them shall be constantly moved in tape feeding direction but not necessarily in tape feeding relation during the entire time that the machine is in operation and it is further contemplated that at least one of these tape feeding elements shall be motor driven. As stated above, the moving of the elements into tape feeding relation and the length of time which these elements remains in such relation, which length of time dictates the length of the tape to be delivered, are proposed to be controlled by an electrical timing circuit.

We further propose to use any convenient means to control the flow of current in the timing circuit which in turn will control the movement of the tape feeding elements into and out of tape feeding relation and the operation of the shear or cutter to sever the delivered strip. In a preferred form of our invention we use a series of specific resistances through which current will flow to a condenser, there being a resistance or set of resistances for each tape length which can be delivered. The time taken to charge the condenser to a fixed voltage is determined by the value of the resistance interposed in the circuit.

Electrical instrumentalities are provided to operate the means for separating the feed elements and severing the strip when the condenser has reached maximum voltage.

In the example of our invention illustrated herein, we have shown a pair of series of switches which may conveniently be operated by push buttons, the operation of which will close the circuit and start the feed, as well as start the building up of the condenser at a rate determined by the resistances which have been interposed, the depression of a button of a series closing the necessary circuits and inserting a resistance corresponding to a length of tape designated on the button.

Further objects and advantages will appear from the following description of preferred embodiments of the invention and the drawings accompanying said description in which drawings, Figure 1 is a longitudinal vertical sectional view through the tape delivering portion of a machine embodying our invention;

Figure 5 is a detail view in longitudinal vertical section of the key construction taken on line 5—5 of Figure 2, electrical instrumentalities being omitted;

Figure 6 is a horizontal sectional view taken on the line 6—6 of Figure 5;

Figure 7 is a transverse section on line 7—7 of Figure 1 showing a preferred form of cutter;

Figure 8 is a wiring diagram of the control mechanism employed to feed and measure the tape, and Figure 9 is a longitudinal vertical sectional view of a modified form of a tape delivering and severing means.

Figure 1:
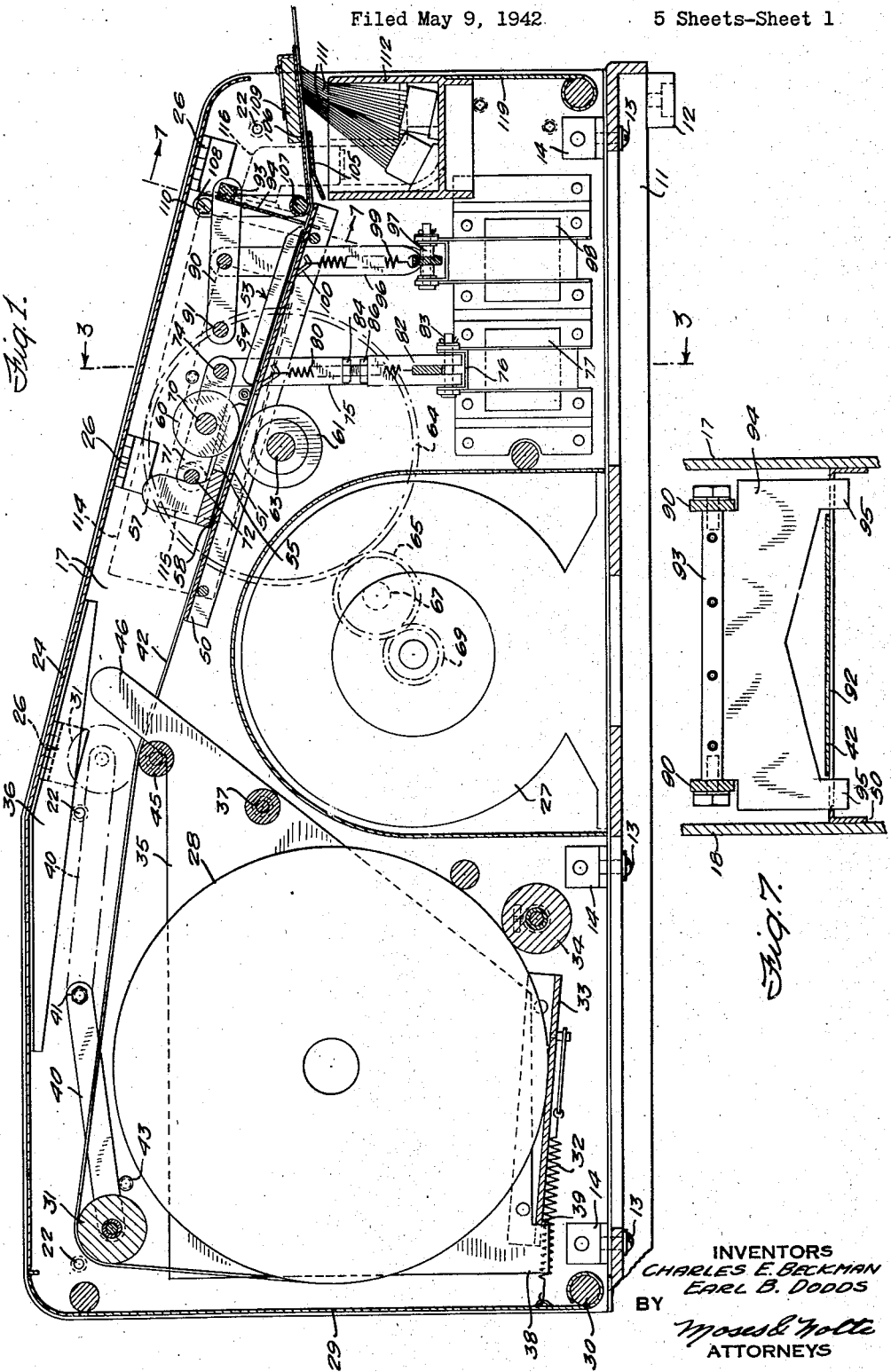

Referring to the drawings in detail, a tape serving machine is shown including means to withdraw tape from a roll and deliver it at the delivery end of the machine in moistened, measured, and severed strips ready for application to a package to be sealed, and a control unit which controls the length of the strip of tape delivered at one actuation.

Figure 2:
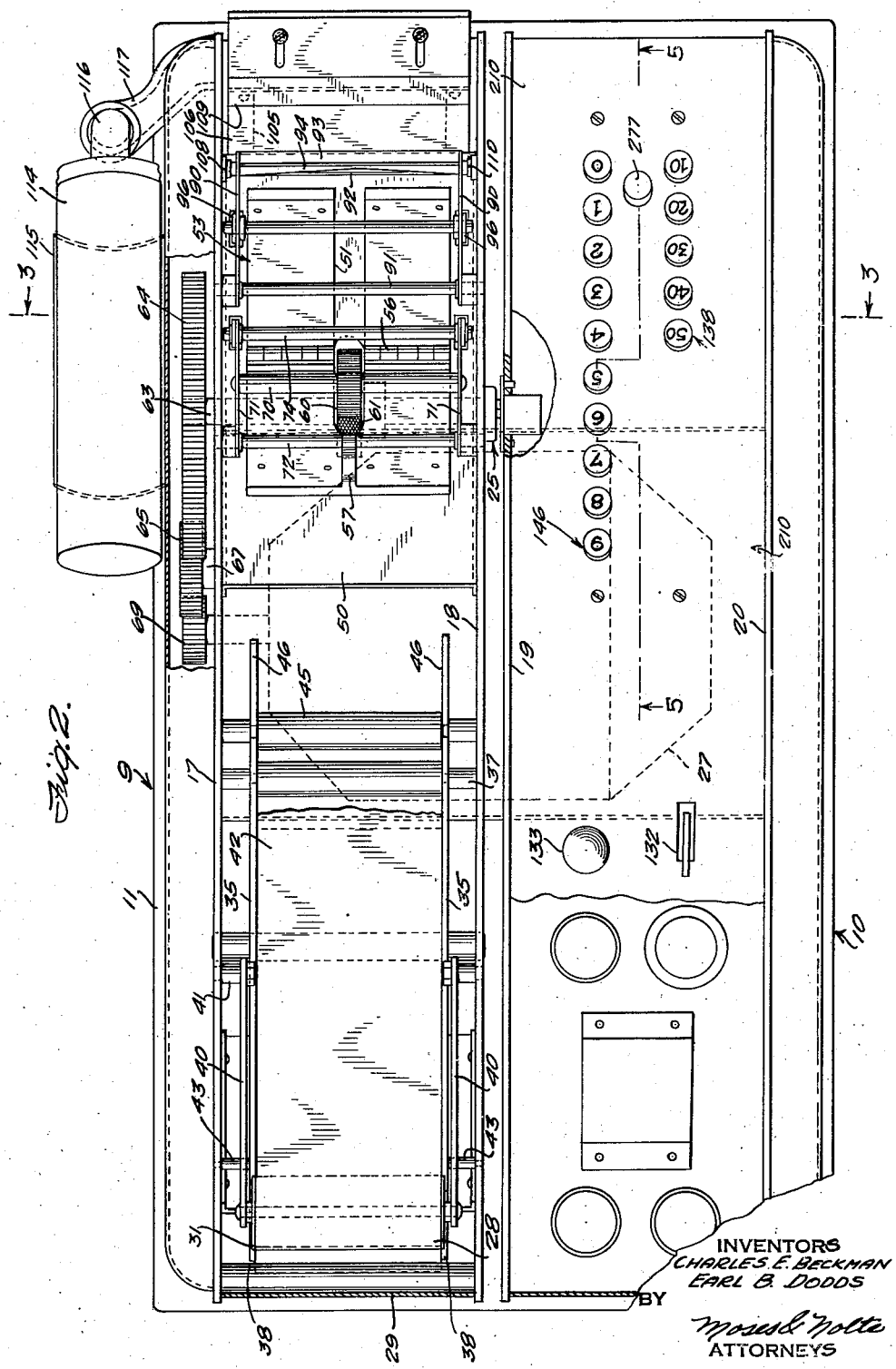
Figure 2 is a plan view of the machine with the top cover removed from the tape delivering portion of the machine and portions of the top of the control section of the machine being broken away.

The tape feeding and control units may be mounted in a single or in separate housings and arranged in any convenient relative location. In the preferred construction illustrated, particularly in Figures 2 and 3, the two units 9 and 10 may preferably be mounted upon a base 11 having feet 12 which rest on the surface on which the machine is placed. The tape serving unit and the control unit may be secured to the base 11 by any convenient means such as screws 13 which hold brackets 14 which are attached to side walls 17 and 18 of the tape delivering unit and 19 and 20 of the control unit. Outside covers 21 may be provided to cover the outer sides of the units and may be secured to the side walls 17 and 20 by the screws 22 secured to spacers 23 so that the entire machine will present a pleasing appearance and be free from openings for the entrance of dust.

It is one of the features of this invention that these two units may be separated from each other conveniently for purposes of cleaning, repair or replacement of parts and to this end it is seen that by removing the screws 13 and by detaching the connecting plug 25, to be described, either unit may be removed from its position on the base for any desired reason. This is a particularly valuable feature with respect to the control unit as if there is any breakdown in such unit, it may be removed and a similar unit put in its place so that little time in operating the machine need be lost. As the two units are mechanically independent, the operative connection between the two consisting entirely of the connecting plug 25 and electrical conductors, it will be seen that the control unit may be mounted in any suitable location either adjacent to or removed from the tape feeding unit, it being only necessary that the electrical conductors extend from one to the other. This permits the mounting of the tape feeding and control units each in the most convenient manner for handling of the tape and actuation of the control members respectively.

Figure 3:
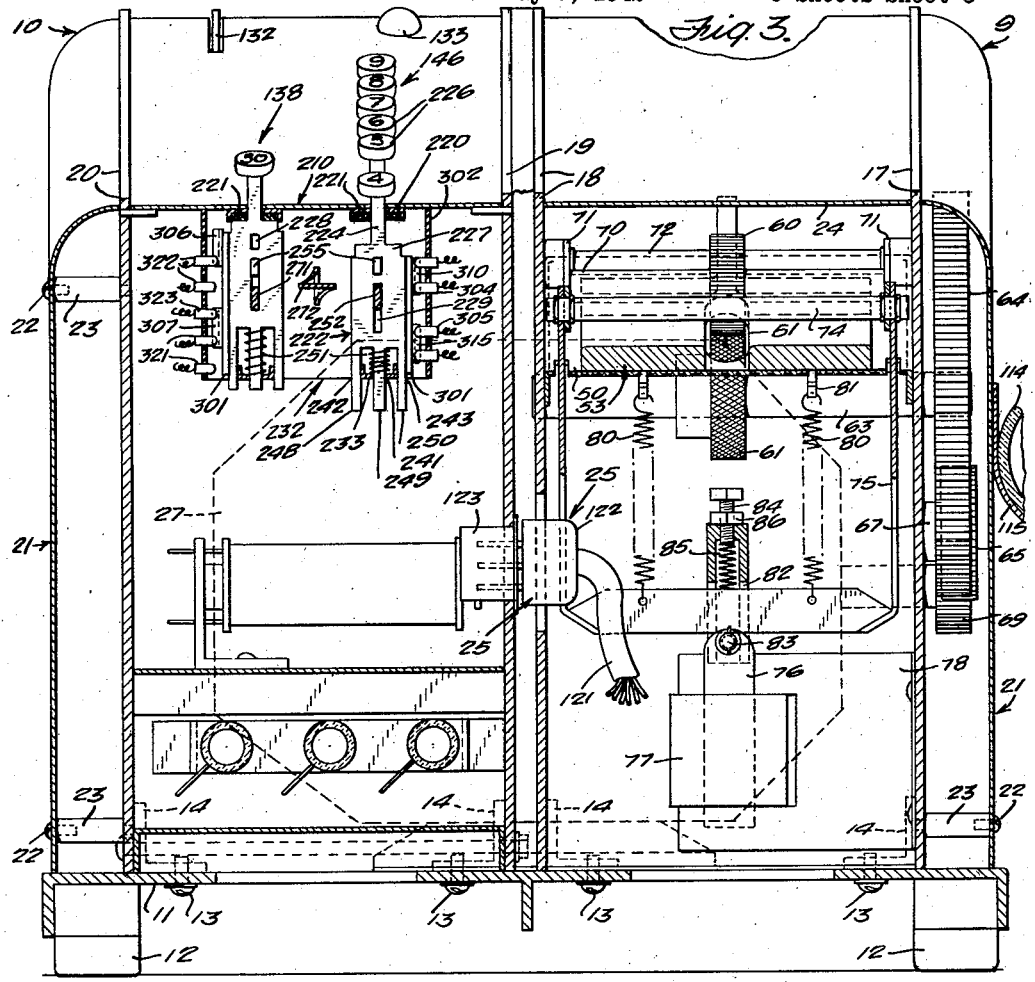
Figure 3 is a transverse section taken at the position indicated by the lines 3—3 of Figures 1 and 2.

The motor 27 for driving the tape feeding means, which will more fully be described below, is preferably mounted to rest on the base 11 in the approximate center of the machine, as illustrated in Figure 1, and when the machine is in operating condition and the control unit in the position shown in Figure 3, the motor will lie partially in the zone of the control unit and partially in the zone of the tape serving unit, the walls 18 and 19 being cut away to provide for this mounting. Inasmuch as the motor is the heaviest part of the machine, it will be seen that this central mounting will be a great convenience should it be necessary to move the machine from one place to another in a shipping room as the weight of the machine will be more or less balanced and will thus render the machine easy to carry. Furthermore the motor is entirely concealed and allows the complete machine to assume a pleasing and symmetrical appearance. A further advantage of mounting the motor in this position appears from Figure 1 as it is seen that the tape roll 28 may be mounted at the rear end of the machine behind the motor in that portion of the machine which has the greatest height whereby the maximum diameter roll may be used obviating the necessity of frequent reloading of the machine. Furthermore, the tape may be brought into proper position for its travel through the delivery means more easily when the tape roll is mounted in this manner. The motor occupies space which might otherwise be wasted between the tape roll and the feeding and cutting devices at the forward end of the machine. Thus the motor is in juxtaposition to the tape feeding devices so that it may be arranged to drive the same through simple gearing and the tape roll is in proper relation to the tape delivery means.

*Tape serving mechanism.*—The tape serving mechanism includes generally holding and guiding means for the roll of tape, tape web guiding means, feeding, severing and moistening means which will be described in that order, that is in the order of the passage of tape through the machine.

*Tape and web guiding.*—The tape roll 28 may be preferably placed in the machine through the top thereof, the top cover 24 which is hinged at 26 to side plate 17 being opened and preferably resting on the fountain 114. The roll 28 rests upon the plate 33 and against the brake roll 34 which together exert a braking action thereon and prevent the roll from becoming excessively unwound during feeding. Access may be had to the roll through the back of the machine by opening cover 29, hinged at 30. Cover 29 is normally held closed by spring 32. The roll is further held in position by the side guide plates 35 pivoted at 37 having guide ears 38 which key with slots 39 in the plate 33. The plates 35 also have web guides 46 which will be more fully described below. The slots 39 may preferably be arranged at distances from each other equivalent to the various common commercial widths of tape so that when the roll is placed in the machine and provisionally centered by hand, the plates 35 may be moved laterally on their pivotal mounting 37 until the ears 38 fall into the proper slots 39. Thus the roll is exactly centered in its proper position so that the tape web will be delivered therefrom centered for further delivery through the machine.

The web guiding roller 31 mounted on the arms 40 which are pivoted at 41 is normally in the full line position shown in Figure 1 during the operation of the machine, but when it is desired to insert a roll of tape in the machine, the top cover 24 being opened, the arms 40 may be swung into the forward position shown in dotted lines in Figure 1 so that the roller 31 will be out of the way of the tape roll during insertion into the machine. With cover 24 open and roller 31 in its forward position, roll 28 can be easily dropped into position and while holding the end of web 42 in one hand, the operator can return roller 31 to its normal position, at rest on pins 43. The web 42 can then be directed by hand to the forward part of the machine without threading it over or under a series of rollers which is the usual custom. The brace 36 serves to render the cover 24 rigid and in addition strikes the roller 31 in its forward position when attempt is made to close cover 24, thus insuring that the machine will not be closed by the operator before it is fully loaded and ready for operation. This construction lends itself to speedy loading without fuss or jamming of the tape in the machine. Also roller 31 in its normal position when feeding a piece of tape from a full roll 28, will lift the roll at the start of feeding off of plate 33 thus removing the friction caused by the plate. Hence, the feeding elements function normally and feed accurate lengths of tape when a full roll of tape is newly inserted in the machine as the inertia of the roll does not interfere with feeding action but in fact helps to prevent inertia feed by settling back on the plate 33 when feeding ceases.

The web 42 travels over the roller 31 and forwardly over the guide roller 45 and between the web guides 46 which are integral extensions of the roll guide plates 35, so that when the adjustment is made by moving the plates 35 on the pivot 37 to adjust the position of the roll 28 the web guides 46 are also placed in position properly to guide the tape web 42 just after it passes the guide roller 45 and just before it enters the tape feeding zone. Hence the adjustment of the plates 35 provides not only roll guiding but also positions the web just before it reaches the feeding elements of the machine.

Figure 4:
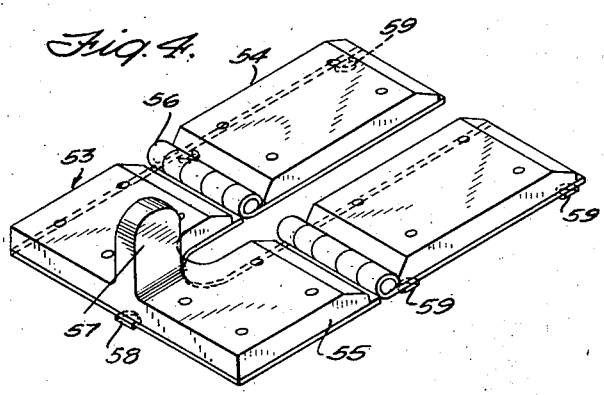
Figure 4 is a perspective view of a portion of the tape guiding means of the tape delivering portion of the machine.

The tape web 42 in its forward passage through the machine rests now on the tape supporting table 50 which has a slot 51 therein through which the tape feeding elements may act. The web is held in its forward movement through the machine on the table 50 by the tape weight 53 which is removably positioned on the table 50. As shown in Figure 4, the weight 53 has similar forward portions 54 and a rear portion 55 joined by hinge 56 and has handle 57 to facilitate grasping the same for removal and to provide a centering means and position adjusting means for the weight as the handle rests against the fixed shaft 72. The weight 53 is preferably relatively substantial so that its weight will insure that the tape which is being pushed forwardly by the feeding elements will not buckle but will continue on its forward path in the machine. Provision of the two piece forward portion 54 hinged at 56 permits easy removal of the entire weight from the machine for cleaning or other purposes. The weight 53 is also formed with a slot in the rear portion 55 to permit action of the feeding elements therethrough.

While the plate 33 and the roller 34 ordinarily prevent any overrun of the tape web 42 from the roll 28, in order to insure accurate measurement, it is desirable to provide a braking means immediately rearward of the tape feeding elements which will prevent any further tape being fed by momentum after the tape feeding elements have ceased to feed and to this end we provide the brake 58 on the under tape web contacting surface of rear portion 55 of tape weight 53 and resting directly on the tape web. The brake 58 tends frictionally to resist the passage of tape beneath it by pressing the tape against the table 50 and the weight of the grasping handle 57 aids in this action. Elements 59 on the under sides of hinged members 54 provide for proper clearance between the weight 53 and the table 50. As they do not contact the tape web 42, they insure that no frictional retardation shall be applied to the web forwardly of the feed means.

*Tape feeding means.*—While any convenient means may be used which are adapted intermittently to be moved in and out of tape feeding engagement during the operation of the machine preferably while motor 27 is running, we prefer to use a pair of feed rollers which grasp the tape between them, only one of the rollers being driven in the form shown. The surfaces of both rollers are preferably knurled or otherwise formed for insuring proper grasping of the tape during feeding.

The roller 61 is mounted for rotation on the shaft 63 which also carries the large gear 64 and is driven thereby. The gear 64 in turn is driven by the pinion 65 which is mounted on the shaft 67 and the pinion 65 is driven by the gear 69 mounted on the shaft of the motor 27. Accordingly, it will be seen that upon the operation of the motor 27, the feed roller 61 will be directly and continuously driven. Any other suitable gearing may be used for driving the feed roller.

The idler 60 is mounted for rotation on the shaft 70 which shaft is journaled in the links 71 at either side of the tape path. The links 71 are pivotally mounted on the fixed shaft 72 mounted in the side walls 17 and 18 of the tape feeding portion of the machine. Links 71 also mount shaft 74 between them. On the ends of shaft 74 are journaled the upper ends of the legs of the U-shaped yoke 75 (see Figure 3) so that vertical movement of the yoke 75 will result in movement of the idler 60 in a vertical direction toward and away from the driven roller 61, thus moving the feed elements in and out of tape feeding relation. The base of the yoke 75 is secured to the armature 76 of a solenoid 77 which is mounted on a bracket 78 secured to the side wall 17 of the machine. The solenoid 77 is adapted when energized to exert a downward pull on the armature 76 whereby the yoke 75 will also be pulled downward and the idler 60 will thus be brought into tape feeding relation with the constantly revolving driven roller 61 whereby tape will be fed.

In order to insure that when the solenoid 77 is not energized the feed rollers will definitely be separated and not feeding tape, springs 80 secured to the base of the yoke 75 and to the hooks 81 which are mounted on the bottom of the table 50 are tensioned to hold the yoke in its extreme upward position limited by the upward limit of movement of the armature 76. It is clear from this construction that the tape feeding rollers will only be in tape feeding relation when the solenoid 77 is energized but in order to insure the proper relation of the tape feeding rollers at all times and also to obviate the necessity of providing a solenoid having a substantial length of stroke, we prefer to provide an adjustable connection between the armature and the yoke 75. This connection may take any convenient form. The connection as shown in Figures 1 and 3 includes the split sleeve 82 through which yoke 75 extends. The sleeve is secured to the armature 76 of solenoid 77 below the yoke 75 by pin 83 which normally is spaced below yoke 75. Sleeve 82 has threaded into it screw 84 which bears against spring 85 within the sleeve and the spring in turn bears against the yoke 75. Lock nut 86 holds screw 84 permanently in adjusted position. Turning of the screw will adjust the position of the yoke with respect to the pin 83 and thus the solenoid 77.

*Tape severing means.*—The tape severing means are mounted forwardly of the feeding means of the machine and may be of any suitable construction. As shown they include the links 90 pivotally mounted on the shaft 91 which is mounted in the side walls 17 and 18. The links have mounted between them at their ends remote from the pivotal mounting, the blade shaft 93 on which is mounted eccentric to the axis of shaft 93 the blade 94. Links 90 also pivotally carry the upper end of yoke 96 which is secured to the armature 97 of the solenoid 98. The knife 94 may take any convenient shape and as shown in Figure 7 has guide members 95 which extend at all times through slot 92 in table 50 thus insuring that the knife will be positioned for operation at all times. The sliding action in slot 92 insures good shearing action because of the eccentric mounting about the axis of shaft 93. Intermediate the guides 95 the knife is shown as of inverted V-shape. The portion of the knife is normally held out of the path of the tape by the springs 99 tensioned between the yoke 96 and the hooks 100 mounted on the bottom of table 50. When the solenoid 98 is energized, the downward pull thereof against the tension of the springs 99 will bring the knife 94 across the path of the tape, severing the same. The means for energizing the solenoid will be described below.

*Moistening means.*—Any suitable type of moistening means may be utilized. As shown, the tape, after passing the cutting means, encounters the plate 105 over which it passes. The tape passes under the pressure plate 106 pivoted at 107 to links 108 which are in turn pivoted at 110 to the walls 17 and 18. The pressure plate carries an adjustable weight 109 adapted to hold the tape in intimate contact with the moistening brushes 111 which are upended in tank 112 and draw moisture therefrom by capillary attraction. The mounting of the plate 106 on the links 108 insures easy removal thereof for purposes of replacement or cleaning. As it is contemplated that the tape will be fed through the machine at relatively high rates of speed, it is desirable in order to secure uniform moistening to provide means for keeping the liquid level in the tank 112 substantially constant and to this end we provide a liquid container or fountain 114 mounted in the cradle 115 on the outside of cover 21. The fountain may be mounted in substantially the position shown in dotted lines in Figure 1 and has outlet 116 leading into passage 117 which connects with the tank 112. Access to the tank for cleaning and inspection may be had through the front opening of the machine 119.

*Connection of feed and control units.*—It is seen that the tape feeding portion of the machine in the form of the machine under discussion contains three different instrumentalities which require electrical actuation. These are the motor which drives the tape feeding elements, the tape feeding solenoid and the cutter solenoid. In order to provide that the tape controlling portion of the machine may be separated from the tape serving portion of the machine, it is preferred to assemble the electrical leads from the motor and the two solenoids, into a single cable diagrammatically indicated at 121 in Figure 3 which terminates in a plug 122 which in turn is adapted to contact the complementary plug 123 which is mounted in the side of the control unit. It will be seen that it will only be necessary to connect this plug in order to place the control and the tape serving parts of the machine in proper electrical connection for operation.

*Control circuit.*—As has previously been pointed out, the length of a piece of tape delivered from the machine is dependent upon the length of time that the feed solenoid 77 is energized to hold the feed rollers 60 and 61 in feeding relation since the motor 27 is of constant speed type.

A preferred hookup of electrical instrumentalities to control the operation of the feeder and cutter solenoids is diagrammatically shown in Figure 8. Power is supplied from any convenient power source 130, it being assumed that, as is customary, the power source will be alternating current. Suitable and obvious changes could be made in the circuits to adapt them to a direct current power source. Connection 131 may be made to the power source and may take the form of a plug or the like in the customary manner. Switch 132 which may conveniently be mounted on the outside of control unit (see Figures 2 and 3) is adapted to provide for the energizing of all of the circuits used so that with the opening of this switch, the entire apparatus is cut off from electrical energy. A suitable pilot light 133 (see Figures 2 and 3) is connected to the power source between leads 134 and 135 so that closing of the switch will result in the pilot light being lighted informing the operator that the machine is ready for operation.

The closing of switch 132 will also close an alternating current circuit through the motor through lead 136, plug 25, the motor, plug 25, and lead 137. Hence the closing of the switch 132 will start the operation of the motor. As the closing of the switch does not cause the feeding of tape, the motor will have time to come to constant speed before a strip is fed.

A power pack 140 or other suitable connection is provided for conversion of the alternating current to direct current. The measuring is accomplished through a constant voltage circuit which includes a condenser 141 and a tube 142, constant voltage output being obtained from the power pack. The tube 142 is adapted to break down when the condenser reaches a given voltage and current flows sufficiently from the starter anode of the tube to the cathode to initiate the flow of current in the main gap of the tube which flow of current is adapted to stop the feeding of tape by operation of a relay which breaks the circuit containing the feed solenoid. We have found a cold cathode tube useful in this connection but other tubes having equivalent characteristics or other devices capable of similar function may suitably be used. The start of the building up of the condenser 141 and the feeding of tape is accomplished by the depression of a key in the unit bank 146 which closes a circuit which operates start relay 143. Operation of the start relay closes circuits which operate the feeder solenoid and start the timing interval. When the condenser 141 reaches a predetermined voltage, the tube 142 permits current to flow in the main gap to operate a stop relay 145. The operation of the relay 145 opens the circuit containing the feeder solenoid 77 and closes a circuit containing the cutter solenoid 98 as well as restoring the depressed key to its normal position readying the machine for delivery of another strip of tape. Inasmuch as direct current of constant voltage is only required in the resistance timing circuit since the relays 143 and 145 may be energized by a non-constant D. C. voltage, only a small portion of the output of the power pack need be utilized for the constant voltage D. C. supply; thus the cost of the power pack may be minimized. The operation of the hookup, including all of the circuits involved, can best be described by illustrating an example of such operation.

*Start relay.*—Thus if key ("9" for instance) in the unit bank 146 is depressed, a circuit will be completed through the lead 147 from the non-regulated direct current supply, lead 148, the key contact 149, the lead 150, the start relay 143, the lead 151 and the lead 152 returning to the negative power supply. The energizing of this circuit, by operating the start relay, has broken contact 154 and has made contacts 155, 156 and 157. Thus four other circuits are affected by operation of the start relay and these will now be described.

The contact 154 being broken, the short circuit which heretofore existed around the condenser 141 and included lead 165, resistance 177, lead 167, contact 154, lead 166, lead 178 and lead 152 is broken. This short circuit served the purpose of keeping the condenser absolutely discharged prior to the commencement of the timing interval.

The making of the contact 155 initiates the flow of regulated direct current to the condenser 141, the circuit including the lead 168 from the power pack, contact 155, lead 169 and the various leads in the tens bank of keys 138 which in their non-depressed condition, (which is the assumption of this example) include no inserted resistances, the lead 170, the lead 171, the key contact 172 which was previously made by the depression of key No. 9 of unit bank 146, the series of resistances 175, the variable resistance 176, the lead 165, to the plate of condenser 141, also the resistance 177 to the starter anode 192 of the tube 142 and the leads 178 and 152 back to the negative power supply. It will be seen that when this circuit is set up the timing interval has begun by applying current of regulated voltage to the condenser 141 which thereupon begins to build up to the break down voltage of the tube 142. When this voltage is reached, current will flow in the starter gap of the tube, i. e., from starter anode 192 to cathode 193, initiating flow of current in the main gap, i. e., between anode 191 and cathode 193. The effect of this action is described below. The variable resistance 176 is provided to permit adjustments in the length of the timing interval which may be necessary to compensate for variations in tape length caused by the lag in tape feed members 60 and 61 engaging the tape to start forward movement thereof. The resistance 177 is inserted as a protection for the tube. The keys in the unit bank 146 are numbered in Figure 8 from 0 to 9 and are adapted to insert resistances into this circuit which will delay the building up of the condenser; the breakdown of the tube and the consequent operation of the stop relay which causes the deenergization of the feed solenoid for proportional periods of time which the feed rollers 60 and 61 will be in feeding contact, feeding 0 to 9 inches. In this instance the 9 inch key has been depressed, and nine 1 inch resistances 175 are in the timing circuit, hence while the condenser is building up, 9 inches of tape will be delivered.

As can be observed, however, from Figure 1 of the drawings, the tape web in the form of machine shown travels for a considerable distance in the machine after it passes the feed elements 60 and 61 and it will be undesirable to feed in the machine, lengths of tape shorter than will, when fed, present the end thereof at the front portion of the machine for grasping and removal. This statement is not intended to limit the construction of the machine to the specific form shown, but it is clear that, for example in Figure 1, if a piece of tape of one inch in length were fed, the forward end thereof would not issue from the machine. This would cause confusion and jamming of the machine when the next strip was fed. Furthermore, as machines of the type under consideration are adapted mainly for use in shipping rooms which do not require such short lengths of tape, it will ordinarily not be necessary to feed such short lengths.

For this reason the description of the circuit which is closed on the closing of contact 155 set forth above applies only to delivery of lengths of tape caused by the depression of the 4 inch key or above of the unit bank 146. If for example the 2 inch key of the unit bank 146 is depressed, the timing circuit will then include the lead 168, the contact 155, lead 169, the various leads of the tens bank 138 as set forth above, lead 170, resistance 180 which may conveniently be made equivalent to a time for delivery of for example ten inches of tape, key contact 181, two resistances 175 below the key contact 181 corresponding to two inches of tape, variable resistance 176 etc. as above. The resistance 180 has the effect of adding enough length to the strip delivered so that it will not become jammed in the machine if by mistake a key in the unit bank 146 below 4 inches should be depressed.

It is clear, however, that it may be desirable at times to feed a length of tape equivalent to one of these lower units of inches plus a multiple of ten inches as for example twenty-two inches and the circuit which will produce the delivery of twenty-two inches will now be described. This circuit will also obtain whenever any key in the bank 138 is depressed, i. e., whenever ten inches or more of tape is desired. The 20 inch key in the tens bank 138 is first depressed but does not close any circuit or cause any tape to be delivered until a key in the unit bank 146 is depressed (obviously if twenty inches alone is desired, the 20 inches key in the bank 138 will first be depressed and the 0 key in the bank 146 will start the timing interval as above described). The 20 inch key in the bank 138 having been depressed, contact between leads 183 and 184 is broken, contact between leads 183 and 185 is made and contact 188 is made. The two inch key in the bank 146 is now depressed and completes a circuit including lead 168, contact 155, lead 169, lead 183, lead 185, resistances 186 equivalent to twenty inches of tape, lead 170, lead 187, key contact 188, lead 189, the last three mentioned conductors being a short circuit around resistance 180, key contact 181 which has made on the depression of the 2 inch key, resistances 175 below the 2 inch key, variable resistance 176, etc. as originally described above. It is seen that the depression of one of the tens keys not only inserts the appropriate resistances into the timing circuit to produce a length of tape equal to a multiple of ten, but also short circuits the resistance 180 which is no longer necessary to prevent the delivery of a piece of tape too short to issue from the machine, whereby a piece of tape equal to a multiple of ten inches plus less than four inches in the example shown is delivered.

With the exceptions apparent from the descriptions, the circuits obtained on depression of a unit key above or below 4, or below 4 including a multiple of 10 from the bank 138, are similar except that more or less resistances are inserted in the circuit and it is accordingly not deemed necessary to describe the obtaining of lengths of tape from 5 to 59 inches which can be obtained in the construction of the example shown; suitable resistances may of course be employed to provide for delivery of lengths greater than 59 inches. It is also clear that any desirable unit of measurement may be employed such as centimeters or multiples of inches or centimeters. It is understood that when a key is depressed, it stays depressed until released by some means and this construction will be more fully pointed out below.

Returning now to the circuits which have been completed by the operation of the start relay 143, it is seen that the contact 156 closes on the operation of the start relay. This contact prepares but does not close a circuit which includes the leads 147 and 148, contact 156, stop relay 145, lead 190, to the anode 191 of the tube 142. When the condenser 141 is charged to the breakdown point of the tube, the starter anode 192 of the tube 142 will pass current to the cathode 193 in the starter gap of the tube and by exerting a trigger or starting action cause the tube to ionize and permit current to pass in the main gap of the tube from the anode 191 to the cathode 193 to the leads 178 and 152, thus completing a circuit which operates the stop relay. However, this circuit is not completed until the tube ionizes so that the contact 156, which is closed by the start relay 143, merely prepares the way for operation of the stop relay.

The contact 157 closes an alternating current circuit which operates the feed solenoid and includes the leads 195, contact 157, lead 196, feed solenoid 77, lead 197, contact 200 of the stop relay which is normally closed when the stop relay is not energized, and lead 152 to the negative power supply. This circuit energizes the feed solenoid so that the feed rollers are now in operation and are feeding tape.

*Stop relay.*—As mentioned in connection with the description of the circuit including the contact 156 which was closed by the operation of the start relay, a path has been prepared for the completion of a circuit which includes the stop relay 145, anode 191 and cathode 193 of the tube 142. Accordingly when the breakdown point of tube 142 is reached and the flow of current from anode 192 to cathode 193 initiates the flow of current from anode 191 to cathode 193 thus completing the circuit, the stop relay will operate. The circuits completed or broken by this stop relay will now be described.

The circuit including contact 200 is normally passing current when the stop relay is not energized. It has been fully described in connection with contact 157 which the operation of the start relay 143 closed. This circuit is broken on the operation of the stop relay 145 and since this circuit includes the feeder solenoid 77, energization of the feeder solenoid ceases, the tape feeding elements separate, and the feeding of tape immediately stops.

On the operation of stop relay 145, contact 201 makes, completing an alternating current circuit which includes lead 195, lead 205, key release solenoid 206, lead 207, contact 201 and lead 152 to negative power supply. The energization of key release solenoid 206 releases the previously depressed keys to their original condition thus preparing the apparatus for the delivery of the next strip of tape. The manner in which this solenoid releases the keys will be more fully pointed out below.

Operation of stop relay 145 closes contact 202 which completes an alternating current circuit including leads 195 and 208, the cutter solenoid 98, lead 209, contact 202 and lead 152 to negative power source. This circuit is seen to include the cutter solenoid 98 and accordingly operates the cutter to sever the already delivered piece of tape.

When the stop relay 145 operates, the contact 200 in the circuit including the feeder solenoid 77, immediately breaks and the solenoid 77 releases the feed elements so that the feed of tape immediately stops. The making of contact 202 results in the energizing of the cutter solenoid 98 but it will be seen that this does not take place until after breaking of the contact 200 so that the tape will have the short time necessary to come to a complete stop before cutting occurs. While we have found that this short time interval is sufficient to allow the tape to come to a stop before cutting, if it should be found that cutting takes place while tape still retains some residual motion, the circuit which includes the cutter solenoid may be utilized to operate a further relay which relay may operate to close a circuit including the cutter solenoid thus lengthening the time interval between the stop of the feeding and the cutting. Naturally since very short periods of time are involved, insertion of this additional relay will result in absolute certainty that no cutting can occur while the tape is moving.

The operation of the key release solenoid 206 in restoring the depressed keys to normal has broken the circuit made by depression of the 9 inch key from the unit bank 146 which circuit included the start relay, and the start relay being no longer energized, the contacts 154, 155, 156 and 157 are restored to the condition in which they were prior to the energization of the start relay 143, that is contact 154 has made restoring the short circuit around tube 142, contact 155 is broken opening the timing circuit, contact 156 is broken opening the circuit including the stop relay 145, and contact 157 is broken opening the circuit which contains the feeder solenoid 77 which has already been broken by the breaking of contact 200 on the operation of stop relay 145.

The breaking of the circuit including contact 156, which deionizes the tube 142, deenergizes the stop relay 145 so that contacts 200, 201 and 202 are restored to their original condition before the operation of the stop relay. Contact 200 in the circuit including the feed solenoid 77 makes, preparatory to the delivery of the next strip of tape but of course not completing a circuit through the solenoid 77. Contact 201 breaks deenergizing the key release solenoid 206 whereby the keys may now be operated to deliver another strip of tape. Contact 202 breaks, breaking the circuit which includes the cutter solenoid 98 whereby the cutter solenoid is deenergized and the knife moves upward from the path of the tape in a manner previously described. The apparatus is now ready for delivery of another strip of tape.

*Key construction.*—It is, of course, clear that any suitable means may be employed for inserting resistances in the timing circuit and it is not intended to limit our invention to the construction shown. However, in Figures 2, 3, 5 and 6 are shown a preferred form of switches actuated by depressible and releasable keys which are adapted on operation to insert suitable resistances into the timing circuit and suitably affect the remaining circuits in the manner described above. We have found it preferable to dispose the keys in convenient position extending above the cover 210 of the control unit, arranged in a units bank 146 and a tens bank 138.

Mounted on the underside of the cover 210 of the control unit is a switch supporting frame 232 which includes upper and lower slotted channel members 220 and 233. The key switches 222 are provided with upper shaft portions 224 and lower body portions 227. The shafts 224 extend through the slotted channel members 220 and the cover 210 and are topped by push buttons 226. The shafts 224 carry shock insulating pads 221 of rubber or the like which absorb the shock of the upward movement of the key against the member 220. The body portions 227 which are considerably wider than the shaft 224 as may be seen from Figure 3, are provided with upper slots 228 and lower slots 229 through which the lock bar 252 extends in a manner to be described. The body portions 227 terminate at their lower ends in three legs 248, 249, and 250. The outside legs 248 and 250 are adapted to pass on either side of the base member 233 when the key is depressed. The middle leg 249 is provided with spring 251 which tends to thrust the key in an upward direction except when it is held depressed by other means.

Referring to Figure 5, the lock bar 252 is provided on its upper surface with extensions 253 having catches 254 and angular top surfaces 255. On depression of a key the edge of slot 229, acting against the inclined surface 255, will force the bar 252 in the direction of the solenoid 206 until the end of the surface 255 is reached. Then the key which is being depressed is further pressed down until the slot 228 engages with the catch member 254 and the spring 262 then forces the bar in a direction away from the solenoid thus engaging the key.

The bar 252 is operatively connected at its end remote from the solenoid to the connecting bar 270 which joins it to the lock bar 271 of the tens bank of keys 138. The mechanical construction and action of these keys is identical with those of the units bank. The bar 270 is also connected with the pull bar 272 which is secured to the armature 260 of the solenoid 206 and may be regarded as an extension thereof. Energization of solenoid 206 will result in clearing of both of the banks of keys of any depressed keys. Spring 262 tends to hold the lock bar in its forward position so that on depression of a key, the same will be positively held in its depressed position until released by the release solenoid 206.

As has been previously described, during the operation of the control unit and after the delivery of a piece of tape, the key release solenoid is energized whereby the armature 260 exerts a pull to the left in Figure 5 thus releasing the catch member 254 and permitting the key to return to its normal position as has been described, ready for the delivery of another piece of tape.

In order that a release may be had of any keys depressed during the time the machine is not in operation, it is preferable to provide a manual key release button which may be utilized to clear the two banks of keys when operation of the machine is about to start. To this end is provided the ear 275 which is mounted on the underside of the frame 210 and which has pivoted thereto at 280 the plate 276. Also pivoted to the plate 276 is the release key 277 which may suitably extend through the frame 210 between the two banks of keys as shown in Figure 6. The release key is normally held in its upward position by spring 278. The plate 276 which may be of rectangular shape, as shown, lies in slot 279 of bar 272 and a downward thrust on the key 277 will result in moving the plate 276 in a clockwise direction about the pivot 280 thus thrusting the bar 272 in a direction to release the keys whereby spring 274 will return bar 272 to its normal position just as effectively as if the solenoid 206 had been energized. Operation of this mechanism prior to operation of the machine will insure that no undesired resistances are in the timing circuits and will further insure that when switch 132 is turned on, the motor 27 will be given an adequate time to warm up and reach constant speed before the machine is operated for delivery of tape. The detailed construction of depressible and releasable keys is substantially that shown in United States Patent No. 2,196,433.

*Switch contacts.*—Any convenient means may be utilized to insure that the operation of the button switches 222 will complete or break the proper circuits as described above in connection with the wiring diagram Figure 8. The construction illustrated in Figure 3 which is also that shown in the above mentioned patent includes insulating material 301 mounted on the side of body portion 227 of the key switch 222 and terminal panel 302 of insulating material mounted on the frame 232. Referring to the wiring diagram Figure 8, it is seen that the depression of a key in the units bank effects the making of two contacts while that of the tens bank effects the making of two contacts and the breaking of one. Consequently we have provided double U-shaped male contacts 310 and 315 on the insulating material 301 of the keys in the bank 146 and double female contacts 304 and 305 on the terminal panel 302. Similarly in the bank 138, double male contacts 306 and 307 are provided on the insulating material 301 and double female contacts 321 and 322 as well as single contact 323 are provided. It will be seen that these contacts are adapted on operation of one of the push button switches to modify the circuits as shown in Figure 8.

In Figure 9 is diagrammatically shown an alternate form of construction of tape delivering and severing means which has the advantage of including only one solenoid for operation of these means. This construction includes the tape table 285 over which the tape web 286 passes. Feed elements include driven roller 288 and idler roller 289. The last mentioned roller is mounted on a pair of arms 291 pivoted at 292 in the side walls of the machine and having mounted on its end, remote from the roller 289, the cutter 294 pivoted at 295. Solenoid 297 has armature 298 operatively connected to the arms 291 between the pivot 292 and the idler roller 289. Arms 291 also have extension spring 300 attached to the arms between the pivot 292 and the pivot 295. It will be seen that energization of the solenoid 297 resulting in a downward pull of the armature 298 will pull the feed roller 289 downward into positive tape feeding engagement with the driven roller 288 and at the same time will move the knife 294 out of the path of the tape. When the solenoid 297 is deenergized the spring 300 will move the arm 291 in a clockwise direction about the pivoted mounting 292 bringing the knife 294 sharply down to sever the tape, while of course separating the feed rollers 288 and 289. In this construction it is preferable to provide the knife 294 with a small amount of travel before it actually contacts the tape. As the feed rollers will separate immediately the spring 300 is thus permitted to act and while the knife 294 travels this short distance, the tape web 286 will come to a dead stop.

While we have described in detail certain preferred procedures to be followed in practicing our invention which we have found to be convenient and practicable, and while we have illustrated and described in detail certain forms of apparatus which we have found well adapted to carry out the required operation, we do not wish to be understood as limiting ourselves to the performance of the process in the precise manner set forth or the following of a particular sequence of operations where not essential to secure the intended result, or to the use of the particular apparatus as set forth in the specification, as we realize that changes both in procedure and in the apparatus are possible and we further intend each step or sequence of steps and each element or instrumentality appearing in any of the following claims to be understood to refer to all equivalent steps, sequences of steps, elements or instrumentalities for accomplishing substantially the same result in substantially the same or equivalent manner.

We claim:

1. An apparatus for feeding measured strips of tape, a pair of feed rolls to feed the tape, a constant speed motor for driving at least one of said rolls in tape feeding direction, said rolls being mounted for relative movement into and out of tape feeding relation, and electrical means for controlling the delivery of strips of tape of predetermined length, said means including a feeder circuit, a timing circuit and a stop circuit, said feeder circuit having instrumentalities for bringing said tape feeding elements into tape feeding relation when said circuit is energized, said timing circuit being coordinately energized with said feeder circuit, said timing circuit completing said stop circuit after a given predetermined interval of time comparable to a given predetermined length of tape and said stop circuit having means to break said feeder circuit whereby said feed rolls are removed from tape feeding relation and feed of tape ceases.

2. An apparatus for delivering strips of tape of predetermined length including feed elements for feeding the tape, a motor mounted to drive at least one of said feed elements in tape feeding direction, at least one of said tape feeding elements being mounted for movement into and out of tape feeding relation, a cutter for severing the tape and electrical means for controlling the delivery of predetermined lengths of tape and the severing of the tape after delivery of tape has ceased, said means including a feeder circuit and a cutter circuit, said feeder circuit including instrumentalities moving said feed elements into tape feeding relation when said circuit is energized whereby energization of said circuit starts the feed of tape, said cutter circuit having instrumentalities operating said cutter when said circuit is energized, a timing circuit adapted to be energized when said feeder circuit is energized whereby the feed of tape and the timing interval will start simultaneously, said timing circuit after a predetermined period being adapted to start the flow of current in a stop circuit, said stop circuit being adapted to break said feeder circuit and thereafter to close said cutter circuit whereby feeding ceases and the tape is severed by the cutter.

3. An apparatus for feeding, measuring and severing strips of tape including a pair of feed elements between which said tape passes, a motor adapted to be driven at constant speed, one of said tape feeding elements being driven in tape feeding direction by said motor, at least one of said elements being mounted for movement into and out of tape feeding relation, a cutter for severing the tape and electrical means for moving said elements into tape feeding relation, holding said elements in tape feeding relation for a predetermined length of time to feed a predetermined length of tape, releasing said elements whereby the feed of tape ceases, and operating said cutter to sever said tape, said means including a feeder circuit having therein means to translate electrical energy into force, and a cutter circuit, said means in said feeder circuit being mounted to move said tape elements into tape feeding relation when said circuit is energized whereby energizing said circuit starts the feed of tape, a timing circuit, said feeder circuit and said timing circuit being adapted to be energized simultaneously whereby the feed of tape and the timing interval will start together, said timing circuit after a predetermined period being adapted to initiate the flow of current through a stop relay, said stop relay having a contact in said feeder circuit and breaking the same when energized whereby feed of tape ceases, and closing said cutter circuit, said circuit containing means to translate electrical energy into force, said means being adapted to operate said cutter when said circuit is energized whereby the cutter is operated.

4. An apparatus for feeding and severing measured strips of tape including a pair of feed elements to feed the tape, a motor mounted to drive at least one of said elements in tape feeding direction, at least one of said elements being movable in and out of tape feeding relation, a cutter to sever the tape and electrical control means to start the feed of tape, measure the length of tape fed, sever the tape and cut the tape, said means including a feeder circuit, a timing circuit, a stop circuit and a cutter circuit, said feeder circuit including means operable on the energization of the circuit to bring said feed elements into tape feeding relation, selective means to energize simultaneously said feeder and timing circuit and to place varying resistances in said timing circuit to vary the time interval of said timing circuit, said stop circuit being energized at the end of said time interval and said stop circuit energizing a relay which breaks said feeder circuit and energizes said cutter circuit whereby the feed of tape stops and the tape is severed.

5. In an apparatus of the class described, a pair of feed elements, one of said elements being mounted for movement in and out of tape feeding relation, said movable element being mounted on a pair of pivoted arms, a yoke, the legs of which are secured to said arms between said pivot and said feed element, and a spring secured to said arms on the other side of said pivot normally holding said feed elements in non-tape feeding relation and electrically operated means to exert force upon said yoke to bring said feed rollers into tape feeding relation against the pull of said spring.

6. An apparatus as claimed in claim 5 in which a tape severing knife is mounted on the end of said arms remote from said feed elements, said knife being adapted to move across the path of the tape when said rollers are moved out of tape feeding relation.

7. In a machine for delivering strips of tape, a roll of tape to be fed, guide members for centering said roll in the machine including a shaft forwardly of said roll, plate members pivotally mounted on said shaft for movement along the axis of said shaft, selective slots near the base of said roll to engage said plates and hold the same in adjusted positions against the sides of the roll, said roll having a web extending therefrom through the machine and integral extensions on said plates extending on either side of said web as it travels through the machine.

8. A machine for delivering strips of tape having a roll of tape to be fed, a shaft in said machine forwardly of said roll, said shaft carrying roll guides slidably mounted thereon, slots in the bottom of the machine beneath said roll, and keys on said guides engaged by said slots whereby said roll is centered, a tape throat in said machine through which tape from said roll is fed, and integral extensions on said guides extending on either side of said web just prior to its entrance into said tape throat.

9. In apparatus for feeding strips of tape, having a tape web and a tape path in which said web travels, a pair of feed elements acting upon said web on the top and bottom thereof while said web is in said path, a weight for holding said tape in said tape path having a rear member, a pair of forward members and hinges joining said rear and forward members, said feed elements acting between said forward members.

10. A weight as claimed in claim 9 having a handle for convenient grasping and additional weight mounted on the rear thereof.

11. In apparatus for feeding strips of tape having a tape web, a table over which the web travels and feeding means mounted to act through said table, a brake acting on said web rearwardly of said tape feeding means, said brake comprising a weight pressing said web upon said table having a projection on the underside of said weight engaging said web directly before it reaches said feeding means and having an additional weight-providing handle mounted directly over said projection.

12. An apparatus for feeding measured strips of tape including an intermittently operable feed device to feed the tape, means to actuate said device to feed tape, an electrical timing circuit energizable coordinately with said actuating means, and instrumentalities actuated by said timing circuit after a timed interval to stop the feed of tape.

13. An apparatus as claimed in claim 12 including means to vary the timed interval.

14. Apparatus as claimed in claim 12 in which the instrumentalities actuated by said timing circuit include a stop circuit to render said feed means inoperative, and means in said timing circuit to energize said stop circuit at the end of a timed interval.

15. Apparatus as claimed in claim 12 in which said timing circuit includes a condenser and a switch operable to stop the feed of tape only when said condenser has received a given predetermined charge.

16. Apparatus as claimed in claim 12 in which said timing circuit includes a condenser and said feed stop instrumentalities include a switch operable to stop the feed of tape when a predetermined charge has been impressed on said condenser, and means to vary the time required to bring said condenser to said charge, said means including a series of resistances selectively insertable into said timing circuit.

17. Apparatus as claimed in claim 12 in which said timing circuit includes the starter gap of a tube and said tape feed stopping instrumentalities include a circuit having the main gap of said tube, ionization of said tube occurring at a given predetermined charge across said starter gap, whereby current flows in said main gap to stop the feed of tape.

18. Apparatus as claimed in claim 12 including means to prevent the feeding of strips of tape of less than a given predetermined length.

19. An apparatus for feeding measured strips of tape including an intermittently operable feed device to feed the tape, electrical means to actuate said device to feed tape, an electrical timing circuit energizable coordinately with said electrical feed actuating means, and instrumentalities actuated by said timing circuit after a timed interval to stop the feed of tape.

20. In an apparatus for feeding measured strips, means to feed said strips and electrical means for actuating said feed means to provide fed strips of predetermined length, said electrical means including a feeder circuit, a timing circuit, a stop circuit and an automatic switch between said timing circuit and said stop circuit, said feeder circuit when energized actuating said feed means to feed strip, said timing circuit having a condenser in series with said switch to insure operation of said switch at a given predetermined charge of said condenser, said stop circuit being energized on operation of said switch and itself operating to open said feeder circuit to stop the feed of strip.

21. An apparatus for feeding measured strips of tape including an intermittently operable feed device to feed the tape, means to actuate said device to feed tape, a series of timing circuits, any one of which is selectively energizable coordinately with said actuating means, and instrumentalities actuated by whichever of said timing circuits is energized to stop the feed of tape after a timed interval.

22. Apparatus as claimed in claim 21 in which each of said timing circuits is energized by operation of a switch, said switch being also operating to start the feed of tape.

23. Apparatus as claimed in claim 21 in which said feed stopping instrumentalities include means to restore the apparatus to its original condition ready for the delivery of another strip of tape.

24. An apparatus for feeding and severing measured strips of tape including an intermittently operable feed device to feed the tape, severing means to sever the fed strip, means to actuate said feed device to feed tape, an electrical time measuring circuit energizable coordinately with said actuating means and instrumentalities actuated by said time measuring circuit after a measured time interval to stop the feed of tape and operate the severing means to sever the fed tape.

25. In apparatus for feeding a tape web, a table over which said web travels, feeding means mounted to act through said table and a weighted member mounted over said web immediately before and behind said feeding means, said member having means rearwardly of said feeding means to tension the web and means forwardly of the feeding means to prevent breaking contact of said member with the web while also preventing buckling of the web.

26. In a tape feeding machine of the class described, tape feeding means, a feed circuit, energizing of which actuates said tape feeding means to feed tape, a timing circuit operable to stop the feed of tape after a given interval of time, a series of electrical devices adapted to be selectively included in said timing circuit to vary the time interval at which said timing circuit will function, and a series a switches, operation of one of which actuates the tape feeding means by completion of said feed circuit, operation of a switch also completing the timing circuit to start a timed interval, each of said switches inserting a different electrical device into said timing circuit to vary the timed interval before said circuit operates to stop the feed of tape.

27. An apparatus as claimed in claim 26 in which said time interval varying electrical devices comprise fixed resistances and said resistances are arranged so that all of the resistances below a given operated switch in a series are inserted in the timing circuit plus a resistance equivalent to a unit length of tape for the switch operated.

28. An apparatus as claimed in claim 26 in which said time interval varying electrical devices inserted in said timing circuit correspond to a desired length of tape.

29. In apparatus for feeding measured strips of tape, a base, a tape serving unit including a casing containing tape feeding elements and severing elements, said casing being removably mounted upon said base, a rotary electric motor, driving connections between said motor and said tape feeding elements, said motor being mounted upon said base independently of said casing, and another casing removably mounted on said base, said second casing containing a control unit including electrical means for controlling the actuation of said tape feeding and tape severing elements, and means whereby said electrical means may be pre-set to cause the delivery of different lengths of tape.

30. In apparatus for feeding measured strips of tape, a tape feeding unit comprising feed rolls, a cutter, a feed solenoid for bringing said rolls into and out of tape feeding position, and a cutter solenoid for actuating said cutter, all said parts being contained within a casing, a rotary electrical motor, driving connections between said motor and said tape feeding rolls, and a separate casing containing electrical devices for controlling the actuation of said solenoids and said motor.

31. In a machine of the class described, a chamber for receiving a roll of tape, a web guide roll mounted above said chamber and normally extending across the opening to the chamber so as to partially obstruct such opening, a pivotal arm for carrying said roll, said arm being mounted for pivotal movement about an axis parallel to the axis of the tape roll and above the tape roll, said arm being long enough so that when swung about its axis the guide roll carried thereon will be moved from a position above the tape receptacle to a position sufficiently removed from and in front of the mouth of said receptacle to permit a roll of tape to be dropped freely into the receptacle and the leading end of the tape brought forward over said guide roll, which may then be swung with its arm to its normal position over the top of the tape receptacle, and stop means for limiting the swinging movement of said arm so as to support the same and the guide roll carried thereby in such normal position so as to guide the tape coming from the tape roll forwardly in the tape path of the machine.

32. In apparatus for feeding measured strips of tape, a tape feeding unit comprising feed rolls, a cutter, and electrical devices for bringing said rolls into tape feeding position and for actuating said cutter, a rotary electric motor, driving connections between said motor and said tape feeding rolls, a support for mounting all of said parts in proper mechanical relationship, and a control unit comprising electrical time measuring means for controlling actuation of said roll moving and cutter actuating devices, said control unit being separable from the tape feeding unit and usable at a distance therefrom, and electrical conductors connecting said electrical devices and electrical time measuring means.

CHARLES E. BECKMAN.
EARL B. DODDS.